United States Patent
Ishida et al.

(10) Patent No.: US 6,410,678 B1
(45) Date of Patent: Jun. 25, 2002

(54) AROMATIC POLYCARBONATE, PRODUCTION METHOD AND MOLDED PRODUCTS THEREOF

(75) Inventors: Makoto Ishida; Koji Ishihata; Koji Maeda, all of Tokyo; Wataru Funakoshi, Iwakuni; Hiroaki Kaneko, Iwakuni; Yuichi Kageyama, Iwakuni; Katsushi Sasaki, Iwakuni, all of (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/890,465

(22) PCT Filed: Nov. 29, 2000

(86) PCT No.: PCT/JP00/08415

§ 371 (c)(1),
(2), (4) Date: Aug. 1, 2001

(87) PCT Pub. No.: WO01/40352

PCT Pub. Date: Jun. 7, 2001

(30) Foreign Application Priority Data

| Dec. 3, 1999 | (JP) | 11-344724 |
| Dec. 3, 1999 | (JP) | 11-344725 |
| Dec. 3, 1999 | (JP) | 11-344726 |
| Dec. 3, 1999 | (JP) | 11-344727 |
| Dec. 3, 1999 | (JP) | 11-344728 |
| Jan. 5, 2000 | (JP) | 2000-000277 |

(51) Int. Cl.$^7$ ............................................. C08G 64/00
(52) U.S. Cl. ............................................. 528/196; 528/198
(58) Field of Search ............................................. 528/196, 198

(56) References Cited

U.S. PATENT DOCUMENTS 5,973,101 A  10/1999  Toshida et al. ............. 528/196

FOREIGN PATENT DOCUMENTS

| EP | 0 293 769 | 12/1988 | C08G/63/62 |
| EP | 0 575 810 A2 | 12/1993 | C08G/64/30 |
| EP | 0 736 561 A2 | 10/1996 | C08G/64/06 |
| EP | 293769 | 12/1998 | |
| JP | A-2-175722 | 7/1990 | C08G/64/30 |
| JP | A-5-148355 | 6/1993 | C08G/64/30 |
| JP | A-6-032885 | 2/1994 | C08G/64/20 |
| JP | A-6-136115 | 5/1994 | C08G/64/40 |
| JP | A-9-165442 | 6/1997 | C08G/64/04 |
| JP | A-11-310630 | 11/1999 | C08G/64/30 |

*Primary Examiner*—Terressa M. Boykin
(74) *Attorney, Agent, or Firm*—Sughrue Mion, PLLC

(57) ABSTRACT

An aromatic polycarbonate which has high durability and is excellent in color tone, transparency and mechanical strength, especially an aromatic polycarbonate which has high durability and stability when it is used under high temperature and high humidity conditions for a long time, and production method and use thereof. In the aromatic polycarbonate which has a sodium element content of 100 ppb or less and a content of each of Ni, Pb, Cr, Mn and Fe of 70 ppb or less and the method of producing a polycarbonate by polycondensing an aromatic dihydroxy compound and a carbonic acid diester, the above aromatic polycarbonate is produced by controlling 1) the content of sodium element contained in each of the above raw materials to 52 ppb or less, 2) the content of each of Fe, Cr, Mn, Ni and Pb to 40 ppb or less and 3) the amount of a specific catalyst to a specific value based on the content of Fe contained in the raw materials.

23 Claims, No Drawings

AROMATIC POLYCARBONATE, PRODUCTION METHOD AND MOLDED PRODUCTS THEREOF

FIELD OF THE INVENTION

The present invention relates to an aromatic polycarbonate which has a small content of a specific metal element and high durability and stability particularly when it is used at a high temperature and a high humidity for a long time, production method and molded products thereof.

DESCRIPTION OF THE PRIOR ART

Aromatic polycarbonates are excellent engineering plastics which are excellent in color, transparency and mechanical strength. Since they have recently been used for various purposes and under wider environmental conditions, high durability and stability are required of the polycarbonates to retain the above characteristic properties even when they are used under high-temperature and high-humidity conditions for a long time.

It is reported that conventional aromatic polycarbonates have problems with durability and stability because they experience a reduction in molecular weight and deterioration in color and transparency when they are used under high-temperature and high-humidity conditions for a long time. A reduction in molecular weight lowers the mechanical strength of a polymer and deterioration in color and transparency detracts greatly from the advantages of the aromatic polycarbonates.

Since it is apprehended that deterioration by moist heat is caused by trace amounts of impurities contained in the polymer, especially metal compounds though the definite chemical structures of chemical species existent in the polymer are unknown, studies are being made on the method of purifying raw materials and the polymer and the effect of reducing the contents of metals for heat resistant stability.

JP-A 5-148355 (the term "JP-A" as used herein means an "unexamined published Japanese patent application") discloses an aromatic polycarbonate having an iron content of 5 ppm or less and a sodium content of 1 ppm or less and JP-A 6-32885 discloses a polycarbonate having a total content of iron, chromium and molybdenum of 10 ppm or less and a total content of nickel and copper of 50 ppm or less.

JP-A 2-175722 teaches that a polycarbonate having an improved color tone is obtained by reducing the total content of hydrolyzable chlorine the content of sodium ions and iron ions in raw materials.

JP-A 11-310630 discloses a method of producing an aromatic polycarbonate by reducing impurities contained in bisphenol A as a raw material, such as iron to 10 ppb by weight and chroman-based impurities to 40 ppm by weight. In the method, some results are achieved by improving color tone, heat resistant stability and gel.

In any one of the above cases, the contents of metals disclosed in examples in which the optimal conditions are realized are still high in the order of ppm and unsatisfactory to retain the excellent color, transparency and mechanical strength of an aromatic polycarbonate for a long time under a severe moist heat condition disclosed by the present invention.

Metal species to be reduced as impurities are limited to sodium, iron and some transition metals. Required durability and stability cannot be achieved under severe conditions simply by reducing the contents of these metals.

Further, it has been revealed from researches conducted by the present inventors that the stability of a polymer is not achieved simply by reducing the amounts of impurities and that the relationship between the amount of a specific impurity contained in the raw materials and an ester exchange catalyst as well as the structural characteristics of a polycarbonate molecule are important factors. Attempts have been made to reduce the number of terminal phenolic hydroxyl groups in the molecule of a polycarbonate and not more than that is made.

Problems to be Solved by of the Invention

It is an object of the present invention to provide an aromatic polycarbonate which has excellent durability and stability and can retain its excellent color, transparency and mechanical strength for a long time under a moist heat condition which cannot be conceived in the prior art.

It is another object of the present invention to provide an industrially advantageous method of producing the above aromatic polycarbonate of the present invention.

It is still another object of the present invention to provide a molded product, for example, injection molded product of the above aromatic polycarbonate of the present invention.

Other objects and advantages of the present invention will become apparent from the following description.

Means for Solving the Problems

Firstly, according to the present invention, the above objects and advantages of the present invention are attained by an aromatic polycarbonate which comprises a main recurring unit represented by the following formula (1):

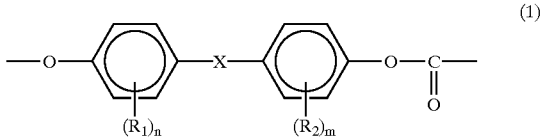

wherein $R_1$ and $R_2$ are each independently a hydrogen atom, alkyl group having 1 to 20 carbon atoms, alkoxy group having 1 to 20 carbon atoms, cycloalkyl group having 6 to 20 carbon atoms, aryl group having 6 to 20 carbon atoms, cycloalkoxy group having 6 to 20 carbon atoms or aryloxy group having 6 to 20 carbon atoms, m and n are each independently an integer of 0 to 4, and X is a single bond, oxygen atom, carbonyl group, alkylene group having 1 to 20 carbon atoms, alkylidene group having 2 to 20 carbon atoms, cycloalkylene group having 6 to 20 carbon atoms, cycloalkylidene group having 6 to 20 carbon atoms, arylene group having 6 to 20 carbon atoms or alkylene-arylene-alkylene group having 6 to 20 carbon atoms, and terminal groups consisting essentially of aryloxy groups (A) and phenolic hydroxyl groups (B), the (A)/(B) molar ratio being 95/5 to 40/60, and which has a melt viscosity stability of 0.5% or less, a sodium metal element content of 100 ppb or less and a content of each of first elements, Ni, Pb, Cr, Mn and Fe of 70 ppb or less.

Secondly, according to the present invention, the above objects and advantages of the present invention are attained by molded products of the aromatic polycarbonate of the present invention.

Thirdly, the above objects and advantages for the present invention are attained by a method for producing a polycarbonate which comprises polycondensing an aromatic dihydroxy compound and a carbonic acid diester in the presence of a catalyst containing a) at least one basic compound selected from the group consisting of a nitrogen-containing basic compound and a phosphorus-containing basic compound in an amount of 10 to 1,000μ chemical equivalents based on 1 mol of the aromatic dihydroxy compound and b) at least one compound selected from the group consisting of an alkali metal compound and an alkali earth metal compound in an amount of 0.05 to 5μ chemical equivalents based on 1 mol of the aromatic dihydroxy compound, wherein the aromatic dihydroxy compound and the carbonic acid diester having 1) a sodium metal element content of 52 ppb or less and 2) a content of each of first elements Fe, Cr, Mn, Ni and Pb of 40 ppb or less are used, and 3) the amount of the basic compound based on 1 mol of the aromatic dihydroxy compound is not more than 20×(Fe*)+200 based on the total weight Fe* (ppb) of Fe contained in the aromatic dihydroxy compound and Fe contained in the carbonic acid diester.

THE PREFERRED EMBODIMENT OF THE INVENTION

The present invention will be described in detail hereinafter.

The aromatic polycarbonate of the present invention comprises the main recurring unit represented by the following formula (1):

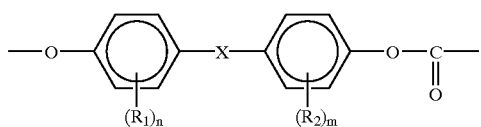

wherein $R_1$ and $R_2$ are each independently an alkyl group having 1 to 20 carbon atoms, alkoxy group having 1 to 20 carbon atoms, cycloalkyl group having 6 to 20 carbon atoms, aryl group having 6 to 20 carbon atoms, cycloalkoxy group having 6 to 20 carbon atoms or aryloxy group having 6 to 20 carbon atoms, m and n are each independently an integer of 0 to 4, and X is a single bond, oxygen atom, carbonyl group, alkylene group having 1 to 20 carbon atoms, alkylidene group having 2 to 20 carbon atoms, cycloalkylene group having 6 to 20 carbon atoms, cycloalkylidene group having 6 to 20 carbon atoms, arylene group having 6 to 20 carbon atoms or alkylene-arylene-alkylene group having 6 to 20 carbon atoms, and terminals groups consisting essentially of aryloxy groups (A) and phenolic hydroxyl groups (B), the (A)/(B) molar ratio being 95/5 to 40/60, and has a melt viscosity stability of 0.5% or less.

According to the present invention, there is provided an aromatic polycarbonate which has excellent durability, stability and transparency when it is used under a severe moist heat condition which cannot be conceived in the prior art for a long time by classifying specific elements contained in the aromatic polycarbonate into some groups according to the sizes of their influences and limiting the contents of these groups to specific values or less.

In the present invention, trace elements which are contained as impurities in the aromatic polycarbonate and raw materials thereof are classified into sodium and the following first to fourth groups according to the sizes of their influences upon the durability, color tone and transparency of the obtained aromatic polycarbonate.

Elements of each group are as follows.
first elements: Ni, Pb, Cr, Mn and Fe
second elements: Cu, Zn, Pd, In, Si and Al
third element: Ti
fourth elements: P, N, S, Cl and Br The aromatic polycarbonate of the present invention has a sodium metal element content of 100 ppb or less and a content of each of the first elements of 70 ppb or less in order to achieve excellent durability and stability when it is used under severe high-temperature and high-humidity conditions for a long time.

To achieve more excellent durability and stability, the aromatic polycarbonate has a sodium metal element content of preferably 70 ppb or less, more preferably 20 ppb or less and a content of each of the first elements of preferably 40 ppb or less, more preferably 20 ppb or less, particularly preferably 10 ppb or less.

The terminal groups of the aromatic polycarbonate of the present invention consist essentially of aryloxy groups (A) and phenolic hydroxyl groups (B) and the (A)/(B) molar ratio is 95/5 to 40/60, preferably 90/10 to 50/50, more preferably 85/15 to 60/40, particularly preferably 80/20 to 70/30.

In the present invention, to obtain an aromatic polycarbonate having more excellent durability and stability, the following relationship is preferably established between the amount (H) (eq/ton-polycarbonate) of the phenolic terminal hydroxyl group and the total (Σfirst elements (ppb)) of contents of the first elements (Ni, Pb, Cr, Mn and Fe).
(H)≦ΣFirst Elements Further, to obtain an aromatic polycarbonate having much more excellent durability and stability, the above relationship is preferably (H)≦0.5×(Σfirst elements).

Further, to obtain an aromatic polycarbonate having further more excellent durability and stability, the content of each of the second elements is preferably 20 ppb or less, the content of the third element is preferably 1 ppb or less, and the content of each of the fourth elements is preferably 1 ppm or less.

The viscosity stability (which will be defined hereinafter) of the molten polymer of the aromatic polycarbonate of the present invention is 0.5% or less. When this value is larger than 0.5%, the hydrolysis deterioration of the aromatic polycarbonate is promoted. To ensure actual hydrolysis resistant stability, the value should be set to 0.5% or less. To this end, it is preferred that a melt viscosity stabilizer which will be described hereinafter should be used especially after polymerization to stabilize the melt viscosity of the aromatic polycarbonate of the present invention. The melt viscosity stability is evaluated by the absolute value of a change in melt viscosity measured at a shear rate of 1 rad/sec and 300° C. under a nitrogen stream for 30 minutes and expressed as a change rate per minute.

The aromatic polycarbonate of the present invention maybe produced by any conventionally known method such as melt polymerization or interfacial polymerization. It is preferably produced by melt polycondensing an aromatic dihydroxy compound and a carbonic acid diester from the viewpoints of costs including process and raw materials and because a polymerization solvent such as chlorinated hydrocarbon does not need to be used and an injurious compound such as phosgene does not need to be used as a carbonic acid ester forming compound.

The melting method is carried out by stirring an aromatic dihydroxy compound (may be abbreviated as BPA group hereinafter) and a carbonic acid diester (may be abbreviated as DPC group hereinafter) while heating under normal pressure and/or vacuum nitrogen atmosphere in the presence of an ester exchange catalyst to distill off the formed alcohol or phenol derived from the carbonic acid diester. The reaction temperature which changes according to the boiling point or the like of the product is generally 120 to 350° C. to remove the alcohol or phenol formed by a reaction, preferably 180 to 280° C. to obtain an aromatic polycarbonate having a small total content of impurities, more preferably 250 to 270° C.

In the latter stage of the reaction, the system is depressurized to facilitate the distillation off of the formed alcohol or phenol. The inside pressure of the system in the latter stage of the reaction is preferably 133.3 Pa (1 mmHg) or less, more preferably 66.7 Pa (0.5 mmHg) or less.

In the present invention, there is provided a method of producing an aromatic polycarbonate by melting an aromatic dihydroxy compound (BPA group) and a carbonic acid diester (DPC group) by heating and polycondensing them in the presence of a catalyst containing a) at least one basic compound (may be abbreviated as NCBA hereinafter) selected from the group consisting of a nitrogen-containing basic compound and a phosphorus-containing basic compound in an amount of 10 to 1,000$\mu$ chemical equivalents based on 1 mol of BPA group and b) at least one compound (may be abbreviated as AMC hereinafter) selected from the group consisting of an alkali metal compound and an alkali earth metal compound in an amount of 0.05 to 5$\mu$ chemical equivalents based on 1 mol of BPA as the aromatic polycarbonate production method of the present invention. In the method of the present invention, BPA group and DPC group having an Na metal element content of preferably 52 ppb or less, more preferably 35 ppb or less, particularly preferably 6 ppb or less and a content of each element of the first element group of preferably 40 ppb or less, more preferably 23 ppb or less, particularly preferably 6 ppb or less are used. The amount ($\mu$ chemical equivalents/1 mol of BPA group) of NCBA must be not more than (20×Fe*+200) based on Fe* (total content of Fe in DPC group and BPA group: ppb).

The content of each of the second elements in DPC group and BPA group is preferably 10 ppb or less.

The content of each of the third element in DPC group and BPA group is preferably 1 ppb or less and the content of each of the fourth elements in DPC group and BPA group is preferably 1 ppm.

According to the present invention, an aromatic polycarbonate having excellent durability can be obtained by using the above BPA group and DPC group whose contents of specific elements are specific values or less as raw materials and an NCBA catalyst in a specific ratio to the content of iron. The contents of metals in conventionally known raw materials are in the order of ppm whereas the contents of metals in raw materials specified by the present invention are each in the order of 0 to 80 ppb, specific metal elements contained in the raw materials are classified into some groups according to the sizes of their influences, the content of each group of the specific elements is limited to a specific value or less, the content of a specific non-metal element is specified, and further an NCBA catalyst is used in a specific ratio to the content of iron in the raw materials, thereby making it possible to produce an aromatic polycarbonate having excellent durability, stability and transparency when it is used under a moist heat condition which cannot be conceived in the prior art for a long time.

It is a surprising fact that impact resistance is improved by using a specific amount of the NCBA catalyst based on an iron impurity at the time of a heat resistance test.

When bisphenol A (may be abbreviated as BPA hereinafter) is used as BPA group used as a raw material in the present invention, an aromatic polycarbonate which is more excellent in color tone can be produced by specifying the total content of organic impurities. That is, BPA having a ratio of the total of the absorption peak areas of a group of compounds (to be referred to as "compound group A" hereinafter) eluting for 15.5 to 24 minutes to the absorption peak area of BPA of 2.0×10$^{-3}$ or less, preferably 1.0×10$^{-3}$ or less when it is measured by specific high-speed liquid chromatography (using a 0.1% phosphoric acid aqueous solution as an elute A and acetonitrile as an elute B, this measurement is carried out at a total flow rate of the elute A and the elute B of 0.9 ml/min when the elute A/elute B ratio is 1:1 for 5 minutes after the start of measurement with a high-speed liquid chromatograph comprising a column having an inner diameter of 4.6 mm and a length of 250 mm, filled with an adsorbent (Inertosil ODS-3 adsorbent of GL Science Co., Ltd.) prepared by bonding 15% (amount of carbon) of an octadecyl group to a high-purity spherical silica gel having a pore diameter of 100 Å and maintained at 40° C.±0.1° C., and then gradient operation is carried out by continuously increasing the amount of the elute B after 5 minutes from the start of measurement so that the elute A/the elute B becomes 0:1 in 55 minutes after the start of measurement while the total flow rate is fixed, to analyze BPA with a detector for ultraviolet light having a wavelength of 254 nm) is used.

More preferably, BPA having a ratio of the total of the absorption peak areas of a group of compounds (to be referred to as "compound group B" hereinafter) eluting for 22 to 24 minutes to the absorption peak area of BPA of 5×10$^{-5}$ (50 ppm) or less, preferably a ratio of the total of the absorption peak areas of compounds having a molecular weight of 307 to 309 eluting for 22 to 24 minutes to the absorption peak area of BPA of 2×10$^{-5}$ (20 ppm) or less when it is measured by the above specific high-speed liquid chromatography is used.

Much more preferably, BPA having a content of 1-naphthol. represented by the following formula (2):

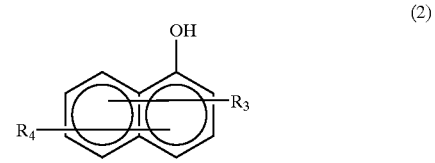

(2)

wherein R$_3$ and R$_4$ are each independently methyl, ethyl, n-propyl, isopropyl or isopropenyl, of 2×10$^{-4}$ part or less by weight, preferably 1×10$^{-4}$ part or less by weight based on 1 part by weight of BPA is used. In the above formula (2), R$_3$ and R$_4$ can be bonded to the 2- to 8-position other than the 1-position (substituted by a hydroxyl group) of a naphthalene ring separately.

Further more preferably, BPA having a content of a paraflavan compound represented by the following formula (3):

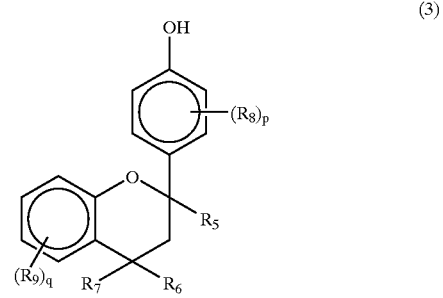

(3)

wherein R$_5$ to R$_7$ are each independently an alkyl group having 1 to 4 carbon atoms, R$_8$ and R$_9$ are each independently an alkyl group having 1 to 4 carbon atoms, and p and q are each independently an integer of 0 to 4, of $5\times10^{-5}$ part or less by weight based on 1 part by weight of BPA and a content of a codimer derivative represented by the following formula (4):

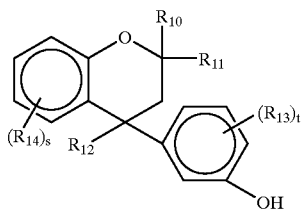
(4)

wherein $R_{10}$ to $R_{12}$ are each independently an alkyl group having 1 to 4 carbon atoms, $R_{13}$ and $R_{14}$ are each independently an alkyl group having 1 to 4 carbon atoms, and s and t are each independently an integer of 0 to 4, of $5\times10^{-5}$ part or less by weight based on 1 part by weight of BPA is used.

Further more preferably, BPA having a content of a chromene compound represented by the following formula (5):

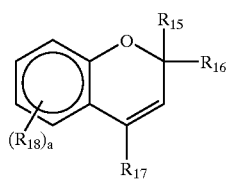
(5)

wherein $R_{15}$ to $R_{17}$ are each independently an alkyl group having 1 to 4 carbon atoms, $R_{18}$ is an alkyl group having 1 to 4 carbon atoms, and a is an integer of 0 to 4, of $1\times10^{-5}$ part or less by weight based on 1 part by weight of BPA and a content of a xanthene represented by the following formula (6):

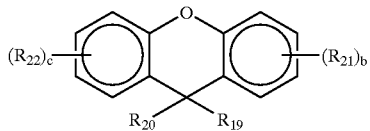
(6)

wherein $R_{19}$ and $R_{20}$ are each independently an alkyl group having 1 to 4 carbon atoms, $R_{21}$ and $R_{22}$ are each independently an alkyl group having 1 to 4 carbon atoms, and b and c are each independently an integer of 0 to 4, of $1\times10^{-5}$ part or less by weight based on 1 part by weight of BPA is used.

Examples of the 1-naphthol represented by the above formula (2) include 2,4-dimethyl-1-hydroxynaphthalene, 2,6-dimethyl-1-hydroxynaphthalene, 2,7-dimethyl-1-hydroxynaphthalene, 3,6-dimethyl-1-hydroxynaphthalene, 2-isopropyl-1-hydroxynaphthalene and 6-isopropenyl-1-hydroxynaphthalene.

Examples of the paraflavan compound represented by the above formula (3) include 2-(4-hydroxyphenyl)-2,4,4-trimethylchroman, 2-(3-methyl-4-hydroxyphenyl)-2,4,4-trimethylchroman, 2-(3,5-dimethyl-4-hydroxyphenyl)-2,4,4-trimethylchroman, 2-(3,5-dimethyl-4-hydroxyphenyl)-2,4,4-trimethylchroman and 2-(3-methyl-4-hydroxyphenyl)-2,4,4,8-tetramethylchroman.

Examples of the codi-mer derivative represented by the above formula (4) include 4-(4-hydroxyphenyl)-2,2,4-trimethylchroman, 4-(3-methyl-4-hydroxyphenyl)-2,2,4-trimethylchroman, 4-(3,5-dimethyl-4-hydroxyphenyl)-2,2,4-trimethylchroman, 4-(3,5-dimethyl-4-hydroxyphenyl)-2,2,4-trimethylchroman and 4-(3-methyl-4-hydroxyphenyl)-2,4,4,8-tetramethylchroman.

Examples of the chromene compound represented by the above formula (5) include 2,2,4-trimethylchroman-(3)-ene, 2,2-dimethyl-4-ethylchroman-(3)-ene, 2,2-dimethyl-4-ethylchroman-(3)-ene, 2,2,6-trimethylchroman-(3)-ene, 2,2-dimethyl-6-ethylchroman-(3)-ene, 2,2,4,6-tetramethylchroman-(3)-ene and 2,2,4-trimethyl-7-butylchroman-(3)-ene.

Examples of the xanthene represented by the above formula (6) include 9,9-dimethylxanthene, 2-butyl-9,9-dimethylxanthene, 3-methyl-9,9-diethylxanthene, 9,9-diethylxanthene, 9-methylxanthene and 2,6,9,9-tetramethylxanthene.

Bisphenol A is produced by dehydrating and condensing acetone and excess phenol in the presence of an acid catalyst such as a uniform acid exemplified by hydrochloric acid or a solid acid exemplified by an ion exchange resin. The bisphenol A obtained by the above production method is easily acquired as a commercially available product and generally contains compounds (impurities) represented by the above formulas (2) to (6).

A conventionally known dihydroxy compound can be advantageously used as BPA group in the present invention. Illustrative examples of the dihydroxy compound include 2,2-bis(4-hydroxyphenyl)propane (that is, BPA), abis(2-hydroxyphenyl)methane, bis(4-hydroxyphenyl)methane, 1,1-bis(4-hydroxyphenyl)ethane, 1,1-bis(4-hydroxyphenyl)propane, 2,2-bis(2-hydroxyphenyl)propane, 2,2-bis(4-hydroxy-3,5-dimethylphenyl)propane, 2,2-bis(4-hydroxy-3,5-dibromophenyl)propane, 2,2-bis(4-hydroxy-3-methylphenyl)propane, 2,2-bis(4-hydroxyphenyl)pentane, 3,3-bis(4-hydroxyphenyl)pentane, 1,1-bis(4-hydroxyphenyl)cyclohexane, bis(4-hydroxyphenyl)sulfide, bis(4-hydroxyphenyl)sulfone and compounds obtained by substituting an aromatic ring of these compounds by an alkyl group or aryl group. Out of these, BPA is particularly preferred from an economical point of view. They may be used alone or in combination of two or more.

Illustrative examples of the DPC group include diphenyl carbonate (may be abbreviated as DPC hereinafter), bis (diphenyl)carbonate, dimethyl carbonate, diethyl carbonate and dibutyl carbonate. Out of these, DPC is preferred from an economical point of view.

An aromatic polycarbonate which has low contents of specific metal elements contained as impurities as described above and is excellent in durability, color tone and transparency can be obtained by purifying BPA and DPC used as raw materials or by purifying an aromatic polycarbonate.

BPA group and DPC group used as raw materials can be purified by a known purification method such as distillation, extraction, recrystallization or a combination thereof.

Besides the above methods, the raw materials are also preferably purified by sublimation at a temperature as low as possible for a long time, more preferably a combination of sublimation and any one of the above purification methods.

The contents of the above impurity elements can be reduced from the level of ppm to the level of ppb which is 1/1,000 or less of the above level by these methods. In addition, the contents of the above organic impurities which have not had attracted much attention can be reduced to predetermined values.

The aromatic polycarbonate can be purified by such a method as the water washing or reprecipitation of a polymer solution. As for the water washing of a polymer, the polymer solution is preferably fully dehydrated after washing. As for dehydration, a treatment with a silica gel or filtration with a fine porous filter is used. The reprecipitation of a polymer is carried out by adding a poor solvent for a polymer such as methanol or acetonitrile to a polymer solution in a solvent such as methylene chloride or 1-methyl-2-pyrrolidinone (may be abbreviated as NMP hereinafter). In order to obtain a polymer having high purity, it is preferred that the poor solvent be gradually added over a long time.

That is, in order to obtain an aromatic polycarbonate having small contents of impurity elements, it is preferred that the raw materials purified by any one of the above methods be used to produce a polymer and the obtained polymer be further purified by any one of the above methods.

To obtain the aromatic polycarbonate having small contents of impurity elements of the present invention, a high-purity solvent having extremely small contents of impurity elements is preferably used for the purification of the raw materials and polymer. To this end, a solvent for the electronic industry may be used.

In the present invention, a specific catalyst, that is, at least one catalyst selected from a) at least one basic compound (NCBA) selected from the group consisting of a nitrogen-containing basic compound and a phosphorus-containing basic compound and b) at least one compound (AMC) selected from the group consisting of an alkali metal compound and an alkali earth metal compound is preferably used for the ester exchange melt polymerization of the aromatic polycarbonate.

Illustrative examples of the catalyst NCBA are given below. Examples of the nitrogen-containing basic compound include ammonium hydroxides having an alkyl, aryl or alkylaryl group such as tetramethylammonium hydroxide ($Me_4NOH$), tetrabutylammonium hydroxide ($BU_4NOH$), benzyltrimethylammonium hydroxide ($\phi\text{-}CH_2(Me)_3NOH$) and hexadecyltrimethylammonium hydroxide; basic ammonium salts having an alkyl, aryl or alkylaryl group such as tetramethylammonium acetate, tetraethylammonium phenoxide, tetrabutylammonium carbonic acid salts, benzyl-trimethylammonium benzoic acid salts and hexadecyltrimethylammonium ethoxide; tertiary amines such as triethylamine, dimethylbenzylamine and hexadecyldimethylamine; and basic salts such as tetramethylammonium borohydride ($Me_4NBH_4$), tetrabutylammonium tetraphenyl borate ($BU_4NBPh_4$) and tetramethylammonium tetraphenyl borate ($Me_4NBPh_4$).

Examples of the phosphorus-containing basic compound include phosphonium hydroxides having an alkyl, aryl or alkylaryl group such as tetrabutylphosphonium hydroxide ($Bu_4POH$), benzyltrimethylphosphonium hydroxide ($\phi\text{-}CH_2(Me)_3POH$) and hexadecyltrimethylphosphonium hydroxide; and basic salts such as tetrabutylphosphonium borohydride ($Bu_4PBH_4$), tetrabutylphosphonium tetraphenyl borate ($Bu_4PBPh_4$) and tetramethylphosphonium tetraphenyl borate ($Me_4PBPh_4$).

The above NCBA is preferably used in an amount of 10 to 1,000$\mu$0 equivalents in terms of basic nitrogen atoms or basic phosphorus atoms based on 1 mol of BPA group. It is more preferably used in an amount of 20 to 500$\mu$ chemical equivalents, particularly preferably 50 to 500$\mu$ chemical equivalents based on the same standard.

It has been discovered that use of NCBA in an amount of not more than ($20 \times Fe^* + 200$) $\mu$ chemical equivalents based on the total weight ($Fe^*$, ppb) of iron contained in the DPC group and BPA group raw materials is particularly effective in improving the color of the obtained aromatic polycarbonate. The amount is particularly preferably not more than ($20 \times Fe^* + 150$) $\mu$ chemical equivalents.

Although the reason for this is not made clear, it is presumed that the interaction between iron contained in the DPC and BPA raw materials and NCBA deteriorates the color tone of the aromatic polycarbonate. In this sense, it is preferred to reduce the contents of impurity elements as much as possible.

Further, in the present invention, to reflect the effect of reducing impurities contained in the raw materials upon the color tone and stability of a polymer, AMC is used in conduction with NCBA. A compound containing an alkali metal compound is preferably used as AMC. The alkali metal compound is used in an amount of $5 \times 10^{-8}$ to $5 \times 10^{-6}$ chemical equivalent in terms of an alkali metal element based on 1 mol of BPA group. Use of the catalyst in the above molar ratio is preferred because it can suppress unfavorable phenomena such as a branching reaction which readily occurs during a polycondensation reaction, a main chain cleavage reaction, the formation of foreign matter in an apparatus at the time of molding and yellowing without impairing the rate of the terminal capping reaction of each molecule and the rate of a polycondensation reaction.

Outside the above range, the alkali metal compound exerts a bad influence upon the physical properties of the obtained aromatic polycarbonate, an ester exchange reaction hardly proceeds to the full, and an aromatic polycarbonate having a high molecular weight is hardly obtained disadvantageously.

The catalyst AMC is, for example, a hydroxide, bicarbonate, carbonate, acetate, nitrate, nitrite, sulfite, cyanate, thiocyanate, stearate, borohydride, benzoate, hydrogenphosphate, or bisphenol or phenol salt of an alkali metal or alkali earth metal.

Examples of the AMC include sodium hydroxide, lithium hydroxide, sodium bicarbonate, potassium bicarbonate, sodium carbonate, lithium carbonate, cesium carbonate, sodium acetate, lithium acetate, sodium nitrate, rubidium nitrate, sodium nitrite, rubidium nitrite, potassium sulfite, sodium cyanate, potassium cyanate, sodium thiocyanate, potassium thiocyanate, lithium thiocyanate, cesium thiocyanate, sodium stearate, lithium stearate, cesium stearate, sodium borohydride, lithium borohydride, sodium tetraphenyl borate, sodium benzoate, disodium hydrogenphosphate, dipotassium hydrogenphosphate, disodium salts, dilithium salts, monosodium salts, sodium potassium salts and sodium lithium salts of bisphenol A, and sodium salts and lithium salts of phenol.

The alkali metal compound may be (a) the ate-complex alkali metal salt of the group XIV element of the periodic table or (b) the alkali metal salt of the oxo acid of the group XIV element of the periodic table. The group XIV element of the periodic table is silicon, germanium or tin.

By using the alkali metal compound as a polycondensation reaction catalyst, a polycondensation reaction can proceed quickly and completely as described above. In addition, these alkali metal compound can control an undesired secondary reaction such as a branching reaction which proceeds during the polycondensation reaction to a low level.

What are enumerated in JP-A 7-268091 may be used as (a) the ate-complex alkali metal salt of the group XIV element of the periodic table, as exemplified by $NaGe(OMe)_5$, $NaGe(OPh)_5$, $LiGe(OPh)_5$, $NaSn(OMe)_3$, $NaSn(OMe)_5$ and $NaSn(OPh)_5$.

(b) The alkali metal salt of the oxo acid of the group XIV element of the periodic table is preferably the alkali metal salt of silicic acid, stannic acid, germanic (II) acid or germanic (IV) acid.

Illustrative examples of the above alkali metal salt include disodium orthosilicate, tetrasodium orthosilicate, disodium monostannate, monosodium germanate (II) ($NaHGeO_2$), disodium orthogermanate (IV) and disodium digermanate (IV) ($Na_2Ge_2O_5$).

In the polycondensation reaction of the present invention, at least one compound selected from the group consisting of oxo acids and oxides of the group XIV elements of the periodic table and alkoxides and phenoxides of the same elements may be optionally used as a co-catalyst together with the above catalyst. By using the co-catalyst in a specific amount, undesired phenomena such as a branching reaction which readily occurs during a polycondensation reaction, a main chain cleavage reaction, the formation of foreign matter in an apparatus at the time of molding and yellowing without impairing the rate of a terminal capping reaction and the rate of a polycondensation reaction can be suppressed more effectively.

The oxo acids of the group XIV elements of the periodic table include silicic acid, stannic acid and germanic acid.

The oxides of the group XIV elements of the periodic table include silicon dioxide, tin dioxide, germanium dioxide, silicon tetrabutoxide, silicon tetraphenoxide, tetraethoxy tin, tetraphenoxy tin, tetramethoxy germanium, tetrabutoxy germanium, tetraphenoxy germanium and condensates thereof.

The co-catalyst is preferably used in such a proportion that the amount of the group XIV element of the periodic table becomes 50 molar atoms or less based on 1 molar atom of an alkali metal element contained in the polycondensation reaction catalyst. When the co-catalyst is used in such a proportion that the amount of the metal element becomes more than 50 molar atoms, the polycondensation reaction slows down disadvantageously.

The co-catalyst is more preferably used in such a proportion that the amount of the group XIV element of the periodic table becomes 0.1 to 30 molar atoms based on 1 molar atom of the alkali metal element contained in the polycondensation reaction catalyst.

Since a sodium compound has a smaller influence upon the durability of the produced aromatic polycarbonate than alkali metal and alkali earth metal compounds other than sodium compounds, the sodium compound is preferably used as a catalyst to obtain an aromatic polycarbonate having excellent durability in the present invention.

When AMC is used as a polymerization catalyst, it is preferably used in an amount of 0.05 to $5\mu$ chemical equivalents, more preferably 0.07 to $3\mu$ chemical equivalents, particularly preferably 0.07 to $2\mu$ chemical equivalents based on 1 mol of BPA group.

When a sodium compound is used as a catalyst, sodium derived from the catalyst is added to a polymer in addition to sodium derived from raw materials. Therefore, it is understood that the sodium compound catalyst must be used in such an amount that the total content of a sodium metal element contained in the polymers should not exceed a specific value in the present invention.

In the present invention, to obtain an aromatic polycarbonate which hardly experiences a reduction in molecular weight and coloring, attention is paid to the viscosity stability (to be defined hereinafter) of a molten polymer and the viscosity stability must be reduced to 0.5% or less. When this value is large, the hydrolysis deterioration of the aromatic polycarbonate is promoted. To secure actual hydrolysis resistant stability, this value should be reduced to 0.5% or less. To this end, a melt viscosity stabilizer is preferably used after polymerization to stabilize melt viscosity. The melt viscosity stability is evaluated by the absolute value of a change in melt viscosity measured at a shear rate of 1 rad./sec and 300° C. under a nitrogen stream for 30 minutes and expressed as a change rate per minute.

The melt viscosity stabilizer in the present invention has the function of deactivating part or all of the activity of a polymerization catalyst used for the production of an aromatic polycarbonate.

The melt viscosity stabilizer may be added while a polymer is molten after polymerization or remolten and added after a polycarbonate is pelletized. In the former case, the melt viscosity stabilizer may be added while a polycarbonate which is a reaction product in a reactor or extruder is molten, or may be added and kneaded while the obtained polycarbonate after polymerization passing through an extruder from a reactor is pelletized.

Known melt viscosity stabilizers may be used. Sulfonic acid compounds such as organic sulfonic acid salts, organic sulfonic acid esters, organic sulfonic anhydrides and organic sulfonic acid betaines are preferred and phosphonium salts of sulfonic acid and/or ammonium salts of sulfonic acid are more preferred because they have the large effect of improving the physical properties such as color, heat resistance and boiling water resistance of the obtained polymer. Out of these, tetrabutylphosphonium dodecylbenzene sulfonate and tetrabutylammonium p-toluene sulfonate are particularly preferred examples.

The polymer of the present invention can be obtained by the above method. A conventionally known processing stabilizer, heat resistant stabilizer, antioxidant, ultraviolet light absorber, antistatic agent, flame retardant, release agent and the like may be added according to application purpose to form moldings from the polymer.

A heat stabilizer may be used to prevent a reduction in the molecular weight of the aromatic polycarbonate of the present invention and deterioration in the color of the aromatic polycarbonate of the present invention. Examples of the heat stabilizer include phosphorous acid, phosphoric acid, phosphonous acid, phosphonic acid and esters thereof. Bis(2,4-di-tert-butylphenyl)pentaerythrityl diphosphite, tris (2,4-di-tert-butylphenyl)phosphite, 4,4'-biphenylene diphosphinic acid tetrakis(2,4-di-tert-butylphenyl), trimethylphosphate and dimethyl benzene phosphonate are preferably used. These heat stabilizers may be used alone or in combination of two or more. The amount of the heat stabilizer is preferably 0.0001 to 1 part by weight, more preferably 0.0005 to 0.5 part by weight, much more preferably 0.001 to 0.1 part by weight based on 100 parts by weight of the aromatic polycarbonate.

To further improve releasability from a metal mold at the time of melt molding, a release agent may be mixed with the aromatic polycarbonate of the present invention in limits that do not impair the object of the present invention. Examples of the release agent include olefin-based wax, olefin-basedwax containing a carboxyl group and/or carboxylic anhydride group, silicone oil, organopolysiloxane, higher fatty acid esters of monohydric and polyhydric alcohols, paraffin wax and beeswax. The amount of the release agent is preferably 0.01 to 5 parts by weight based on 100 parts by weight of the aromatic polycarbonate.

Out of the higher fatty acid esters, a partial ester or whole ester of a monohydric or polyhydric alcohol having 1 to 20 carbon atoms and a saturated or unsaturated fatty acid having 10 to 30 carbon atoms is preferred. Preferred examples of the partial ester or whole ester of a monohydric or polyhydric alcohol and a saturated or unsaturated fatty acid include glycerol monostearate, glycerol tristearate and pentaerythritol tetrastearate. The amount of the release agent is preferably 0.01 to 5 parts by weight based on 100 parts by weight of the aromatic polycarbonate.

An inorganic or organic filler may be mixed with the aromatic polycarbonate of the present invention in limits that do not impair the object of the present invention to improve rigidity. Examples of the inorganic filler include lamellar or granular inorganic fillers such as talc, mica, glass flake, glass bead, calcium carbonate and titanium oxide; fibrous fillers such as glass fiber, glass milled fiber, wollastonite, carbon fiber, aramide fiber and metal-based conductive fiber; and organic particles such as crosslinked acrylic particles and crosslinked silicone particles. The amount of the inorganic or organic filler is preferably 1 to 150 parts by weight, more preferably 3 to 100 parts by weight based on 100 parts by weight of the aromatic polycarbonate.

The inorganic filler usable in the present invention may be surface treated with a silane coupling agent or the like. A good result such as the suppression of the decomposition of the aromatic polycarbonate is obtained by this surface treatment.

Another resin may be mixed with the aromatic polycarbonate of the present invention in limits that do not impair the object of the present invention.

Examples of the another resin include polyamide resin, polyimide resin, polyether imide resin, polyurethane resin, polyphenylene ether resin, polyphenylene sulfide resin, polysulfone resin, polyolefin resin such as polyethylene and polypropylene, polyester resins such as polyethylene terephthalate and polybutylene terephthalate, amorphous polyacrylate resin, polystyrene resin, acrylonitrile/styrene copolymer (AS resin), acrylonitrile/butadiene/styrene copolymer (ABS resin), polymethacrylate resin, phenolic resin and epoxy resin.

The aromatic polycarbonate of the present invention is excellent in the effect of retaining durability, especially durability under severe temperature and humidity conditions for a long time. Therefore, substrates for high-density optical disks typified by compact disks (CD), CD-ROM, CD-R, CD-RW, magnet optical disks (MO), digital versatile disks (DVD-ROM, DVD-Video, DVD-Audio, DVD-R, DVD-RAM, etc.) obtained from this polymer can have high reliability for a long time. It is particularly useful for high-density optical disks such as digital versatile disks.

Sheets obtained from the aromatic polycarbonate of the present invention are excellent in adhesion and printability. Therefore, making use of their characteristic properties, they are widely used in electric parts, construction parts, auto parts and the like, specifically glazing parts products for widow materials, that is, glazing parts window materials for general houses, gyms, baseball domes and vehicles (construction machines, automobiles, buses, Shinkansen, trains, etc.), side wall plates (wainscots for sky domes, top lights, arcades and condominiums, side walls along roads), window materials for vehicles, displays and touch panels for OA equipment, membrane switches, photo covers, polycarbonate resin laminated boards for water tanks, front panels for projection TVs and plasma displays, Fresnel lenses, and optical products such as optical cards, optical disks, liquid crystal cells produced by combining polarization plates, and phase difference compensators. The thickness of the aromatic polycarbonate sheet is not particularly limited but generally 0.1 to 10 mm, preferably 0.2 to 8 mm, particularly preferably 0.2 to 3 mm. Processing treatments (such as lamination for improving weatherability, scuffing resistance improving treatment for improving surface hardness, surfacing with a matt finish or embossing finish and treatments for obtaining a translucent surface and opaque surface) for providing new functions to the aromatic polycarbonate sheet may be made.

The aromatic polycarbonate of the present invention is mixed with the above additives by any means such as a tumbler, V-shaped blender, super mixer, "Nauter" mixer, Banbury mixer, kneading roll, extruder or the like. The thus obtained aromatic polycarbonate resin composition can be formed into a sheet by melt extrusion directly or after it is pelletized by a melt extruder.

Moldings having excellent durability and stability can be obtained from the aromatic polycarbonate of the present invention by molding such as injection molding.

The aromatic polycarbonate of the present invention may be used for any purpose. As partly described above, it can be advantageously used in electronic and communication equipment, OA equipment, optical parts such as lenses, prisms, optical disk substrates and optical fibers, electronic and electric materials for home electric appliances, lighting members and heavy electric members, car interiors and exteriors, precision machinery, machine materials such as insulating materials, medical materials, security and protection materials, sports and leisure goods, sundry goods such as household goods, container and packing materials, display and ornament materials and composite materials of other resins and organic or inorganic materials.

The aromatic polycarbonate of the present invention is particularly preferably used in an optical disk substrate due to its excellent durability and stability.

EXAMPLES

The following examples are provided for the purpose of further illustrating the present invention but are in no way to be taken as limiting. Methods for testing aromatic polycarbonates produced in the examples are as follows.

1) Viscosity Average Molecular Weight (Mw)

This is obtained from an intrinsic viscosity ($[\eta]$) measured in methylene chloride at 20° C. by an Ubbelohde's viscometer according to the following expression.

$$[\eta]=1.23\times10^{-4}\ Mw^{0.83}$$

2) Determination of Contents of Metal Impurities

The contents of metals contained in a polymer are determined by drawing a calibration curve for a solution of 0.5 g of the polymer dissolved in 25 g of NMP for the electronic industry by the ICP-MS SPQ9000 of Seiko Instrument Co., Ltd. to be measured.

3) High-speed Liquid Chromatography of BPA Column

A column having an inner diameter of 4.6 mm and a length of 250 mm, filled with the Inertosil ODS-3 adsorbent of GL Science Co., Ltd. prepared by bonding 15% (amount of carbon) of an octadecyl group to a high-purity spherical silica gel having a pore diameter of 100 Å, is used and maintained at 40±0.1° C.

Eluting Conditions

Using a 0.1% phosphoric acid aqueous solution as an elute A and acetonitrile as an elute B, measurement is carried out at a total flow rate of the elute A and the elute B of 0.9 ml/min when the ratio of the elute A to the elute B is 1:1 for 5 minutes after the start of measurement, and then gradient operation is carried out by continuously increasing the amount of the elute B after 5 minutes from the start of measurement until the ratio of the elute A to the elute B becomes 0:1 in 55 minutes after the start of measurement while the total flow rate is fixed. 0.1% phosphoric acid aqueous solution: phosphoric acid of JIS special grade or higher is diluted with distilled water for high-speed liquid chromatography to 0.1±0.0001%, elute B: acetonitrile for high-speed liquid chromatography is used. chromatograph: LC-10A of Shimadzu Corporation. detector; detector for ultraviolet light having a wavelength of 254 nm a) Analysis of Compound Group A The ratio of the total of the absorption peak areas of compounds eluting for 15.5 to 24 minutes to the absorption peak area of BPA when 2 g of BPA is dissolved in 3 ml of acetonitrile and analyzed is measured. When BPA having a value of $2.0 \times 10^{-3}$ or less as the above ratio is used, a polycarbonate having an excellent level of color can be produced.

b) Analysis of Compound Group B

The ratio of the total of the absorption peak areas of compounds eluting for 22 to 24 minutes to the absorption peak area of BPA when 2 g of BPA is dissolved in 3 ml of acetonitrile and analyzed is measured. When BPA having a value of 50 ppm or less as the above ratio is used, a polycarbonate having an excellent level of color can be produced.

4) Melt Viscosity Stability

The melt viscosity stability of a polymer is evaluated. The absolute value of a change in melt viscosity is measured under a nitrogen stream at a shear rate of 1 rad./sec and 300° C. by the RAA fluidity analyzer of Rheometrics Co., Ltd. for 30 minutes to obtain a change rate per minute. When the aromatic polycarbonate has excellent stability for a long time, this value does not exceed 0.5%.

5) Temperature and Humidity Deterioration Test of Aromatic Polycarbonate

To test the long-term durability under severe high-temperature and high-humidity conditions of an aromatic polycarbonate, the aromatic polycarbonate is maintained at a temperature of 90° C. and a relative humidity of 90% for 1,000 hours. 10 samples are prepared for each polymer and the following measurements are made to evaluate each polymer based on mean values.

5-1) Deterioration in Color

The color of a polymer chip is measured by the Z-1001DP color difference meter of Nippon Denshoku Co., Ltd. The larger the L value the brighter the polymer chip becomes and the smaller the b value the less the polymer chip yellows. When a reduction in L value and an increase in b value (Δb value in the table) are 1.0 or less, it is evaluated that the polymer chip retains desired color stability even when it is used under severe temperature and humidity conditions for a long time.

5-2) Transparency

A plate measuring 50×50×5 mm is molded by the Neomat N150/75 injection molding machine of Sumitomo Heavy Industries, Ltd. at a cylinder temperature of 280° C. and a molding cycle of 3.5 seconds and measured for its total light transmittance by the NDH-Σ180 of Nippon Denshoku Co., Ltd. The higher the total light transmittance the higher the transparency becomes. When the plate has a total light transmittance retention of 90% or more after a deterioration test, it is evaluated that the plate retains desired transparency even when it is used under severe temperature and humidity conditions for a long time.

5-3) Moist Heat Stability of Impact Resistance

This is evaluated based on ASTM D-256 Izod impact strength (notched). After the polymer is dried at 120° C. under high vacuum for 12 hours, a metal mold is used to form a 3.2 mm thick injection molded plate. The Izod impact strength retention of this plate before and after a moist heat treatment is obtained. When the plate has a retention of 90% or more, it is judged that the plate retains desired strength under a long-term moist heat condition.

6) Determination of Concentration of Terminal Hydroxyl Groups, and of Number of Aryloxy Terminals 0.02 g of a polymer sample is dissolved in 0.4 ml of heavy chloroform to measure the concentration of OH terminals using $^1$H-NMR (EX-270 of JEOL Ltd.) at 20° C. The number of aryloxy terminal groups is calculated as a difference between the total number of terminals obtained from the following expression and the number of OH terminals.

$$\text{total number of terminals} = 56.54/[\eta]^{1.4338}$$

7) Melt Hazen Color Number (APHA)

"Pyrex" color comparison tube with a flat bottom having a diameter of 23 mm and a thickness of 1.5 mm is used to compare its melt hazen color number with that of a hazen standard color comparison liquid at a liquid depth of 140 mm in a molten state based on a color number test method specified in JIS K-4101.

Measurement Method 54 g of bisphenol A and 2 mg of tetramethylammonium hydroxide are charged, and the melt hazen color number of the resulting mixture in a molten state in the atmosphere at 175° C. and the melt hazen color number after the resulting mixture is maintained at 175° C. for 2 hours are measured.

Measurement Method 54 g of diphenyl carbonate and 2 mg of tetramethylammonium hydroxide are charged, and the melt hazen color number of the resulting mixture in a molten state in the atmosphere at 250° C. and the melt hazen color number after the resulting mixture is maintained at 250° C. for 2 hours are measured.

When bisphenol A has a melt hazen color number of 20 or less at 175° C. and a melt hazen color number of 40 or less after it is maintained at 175° C. for 2 hours, it can be used as a raw material for a polycarbonate.

When diphenyl carbonate has a melt hazen color number of 10 or less at 250° C. and a melt hazen color number of 20 or less after it is maintained at 250° C. for 2 hours, it can be used as a raw material for a polycarbonate.

Purification of Raw Materials

Bisphenol A (BPA) and diphenyl carbonate (DPC) purified as follows were used as raw materials for an aromatic polycarbonate.

1) Purification of BPA

1)-1 Sublimation Purification

Commercially available BPA was charged into a glass sublimation purifier to carry out sublimation purification slowly under a nitrogen atmosphere at a pressure of 13 Pa (0.1 Torr) and a temperature of 140° C. for 5 hours using a decompressor to obtain purified BPA. Sublimation purification was repeated 2 to 4 times as required to prepare purified samples.

As for the obtained purified BPA, a sample obtained by carrying out sublimation purification once was designated as Aa*1, a sample obtained by carrying out sublimation purification twice was designated as Aa*2, and samples obtained by carrying out sublimation purification 3 times, 4 times and n times were designated as Aa*3, Aa*4, . . . , Aa*n.

1)-2 Washing Purification

Sublimation purified BPA Aa*1 was rinsed with acetone or methanol and dried. The samples were designated as A-Rac and A-Rme.

1)-3 Recrystallization Purification

Commercially available BPA was recrystallized from acetone and dried under vacuum. A sample obtained by carrying out recrystallization once was designated as Ab*1 and a sample obtained by carrying out recrystallization twice was designated as Ab*2.

Separately from these, a purified bisphenol sample Aab*2 was prepared by recrystallizing sublimation purified Aa*1 as a raw material once and further purifying it by sublimation again and then recrystallization.

1)-4 Crystallization Purification

Commercially available BPA was dissolved in a five-fold amount of phenol to obtain adduct crystals of bisphenol and phenol at 40° C. The phenol was removed from the obtained adduct crystals by steam stripping at 5.33 kPa (40 Torr) and 180° C. until the amount of phenol in BPA became 3%. Samples which had been purified by crystallization were designated as Ac*1 and Ac*2 according to the number of times of crystallization.

2) Production of DPC
Raw Material 1 (Dg)

DPC is produced in accordance with a method described in "Plastic Material Lecture 17, Polycarbonate" written by Shoichi Sakajiri et al., pp.45–46.

Raw Material 2

DPC is obtained by purifying DPC produced in accordance with Example 1 of JP-A 7-188116 (Bayer AG) by a method described in "Plastic Material Lecture 17, Polycarbonate" written by Shoichi Sakajiri et al., pp. 45–46.

Raw Material 3

DPC is obtained by purifying DPC produced from commercially available dimethyl carbonate in the presence of Ti(OBu)$_4$ as a catalyst in accordance with Example 1 of JP-B 7-091230 (the term "JP-B" as used herein means an "examined Japanese patent publication") (Asahi Chemical Industry Co., Ltd.) by the above method.

The raw materials 2 and 3 had an extremely bad APHA (melt hazen color number) owing to impurities and were judged as difficult to be used.

3) Purification of DPC
3)-1 Sublimation Purification

The same apparatus as used for the sublimation purification of BPA was used for DPC to carry out sublimation purification under a nitrogen atmosphere at a pressure of 30 Pa (0.3 Torr) and a temperature of 77° C. for 4 hours n number of times to obtain purified DPC.

A sample obtained by carrying out sublimation purification once was designated as Da*1, a sample obtained by carrying out sublimation purification twice was designated as Da*2, and samples obtained by carrying out sublimation purification 3 times, 4 times and n number of times were designated as Da*3, Da*4, . . . , Da*n.

3)-2 Washing in Water+Distillation+Sublimation Purification

Separately from these, raw material DPC was washed in hot water (50° C.) three times, dried and distilled under vacuum in accordance with a method described in "Plastic Material Lecture 17, Polycarbonate" written by Toshihisa Tatekawa (Nikkan Kogyo Shimbun Co., Ltd.), pp.45 to collect a fraction at 167 to 168° C. and 2,000 kPa (15 mmHg) which was further purified by sublimation as described above to obtain purified diphenyl carbonate D-c.

3)-3 Ion Exchange Purification

The raw material DPC was dissolved in a ten-fold amount of acetone and let pass through a cation and anion mixed ion exchange column, the solvent was distilled off under vacuum, and the DPC was purified by sublimation to obtain purified diphenyl carbonate D-d.

Impurities contained in the purified bisphenol A and diphenyl carbonate were measured by the above method and the results are shown in Tables 1 to 3 below.

TABLE 1

| sample name of BPA | purification | metal impurities (ppb by weight) | | | | | | | | | | | | non-metal impurities (ppm by weight) | | | | |
|---|---|---|---|---|---|---|---|---|---|---|---|---|---|---|---|---|---|---|---|
| | | first elements | | | | | | second elements | | | | | third element | fourth elements | | | | | |
| | | Na | Fe | Cr | Mn | Ni | Pb | Cu | Zn | Pd | In | Al | Si | Ti | P | N | S | Cl | Br |
| Ag | raw material | 86 | 60 | 5 | 4 | 8 | 5 | 1* | 11 | 1* | 7 | 22 | 25 | 1* | 1* | 1 | 1 | 30 | 1* |
| Aa*1 | one time of sublimation purification | 20 | 42 | 3 | 2 | 1 | 1 | 1* | 2 | 1* | 4 | 13 | 14 | 1* | 1* | 1 | 1 | 12 | 1* |
| A-Rme | sublimation + one time of washing | 20 | 42 | 3 | 2 | 1 | 1 | 1* | 2 | 1* | 4 | 13 | 14 | 1* | 1* | 1 | 1 | 12 | 1* |
| A-Rac | sublimation + one time of washing | 20 | 42 | 3 | 2 | 1 | 1 | 1* | 2 | 1* | 4 | 13 | 14 | 1* | 1* | 1 | 1 | 12 | 1* |
| Aa*2 | two times of sublimation purification* | 10 | 26 | 1* | 1* | 1* | 1* | 1* | 1* | 1* | 1* | 1* | 8 | 1* | 1* | 1* | 1* | 4 | 1* |
| Ac*1 | one time of crystallization | 45 | 35 | 2 | 1 | 1* | 1* | 1* | 3 | 1* | 3 | 15 | 12 | 1* | 1* | 1* | 1* | 8 | 1* |
| Ac*2 | two times of crystallization | 40 | 27 | 1 | 1 | 1* | 1* | 1* | 2 | 1* | 1 | 11 | 7 | 1* | 1* | 1* | 1* | 2 | 1* |
| Ab*1 | one time of recrystallization with acetone | 19 | 43 | 2 | 4 | 2 | 1 | 1 | 2 | 1* | 4 | 12 | 10 | 1* | 1* | 1* | 1* | 6 | 1* |
| Ab*2 | two times of recrystallization with acetone | 17 | 22 | 1 | 2 | 1* | 1* | 1* | 1 | 1* | 2 | 8 | 5 | 1* | 1* | 1* | 1* | 2 | 1* |
| Aab*2 | two times of (sublimation + recrystallization with acetone)* | 5 | 8 | 1* | 1* | 1* | 1* | 1* | 1* | 1* | 1* | 1* | 3 | 1* | 1* | 1* | 1* | 1* | 1* |

1* indicates below detection limit.

TABLE 2

| sample name of BPA | purification | peak area ratio based on BPA | | |
|---|---|---|---|---|
| | | group A (*10-3) | group B (ppm) | B: molecular weight: 307–309 (ppm) |
| Ag | raw material | 3.2 | 86 | 55 |
| Aa*1 | one time of sublimation purification | 2.7 | 66 | 36 |
| A-Rme | sublimation + one time of washing | 1.7 | 47 | 28 |
| A-Rac | sublimation + one time of washing | 1.6 | 45 | 28 |
| Aa*2 | two times of sublimation purification* | 1.9 | 45 | 28 |

TABLE 2-continued

| | | | | |
|---|---|---|---|---|
| Ac*1 | one time of crystallization | 1.1 | 45 | 27 |
| Ac*2 | two times of crystallization | 1.6 | 11 | 17 |
| Ab*1 | one time of recrystallization with acetone | 0.9 | 41 | 25 |
| Ab*2 | two times of recrystallization with acetone | 0.8 | 11 | 5 |
| Aab*2 | two times of (sublimation + recrystallization with acetone)* | 0.6 | 10 | 4 |

| sample name of BPA | organic impurities (ppm by weight) | | | | | hazen | |
|---|---|---|---|---|---|---|---|
| | naphthol | paraflavan | codimer | chromene | xanthene | APHA 0 hour | APHA retention for 2 hours |
| Ag | 280 | 71 | 63 | 21 | 32 | 30 | 60 |
| Aa*1 | 230 | 65 | 50 | 18 | 22 | 20 | 40 |
| A-Rme | 166 | 29 | 27 | 11 | 8 | 10 | 25 |
| A-Rac | 153 | 30 | 25 | 8 | 5 | 10 | 25 |
| Aa*2 | 190 | 58 | 45 | 15 | 14 | 15 | 30 |
| Ac*1 | 175 | 26 | 27 | 7 | 6 | 20 | 35 |
| Ac*2 | 30 | 5* | 5* | 5* | 5* | 5 | 20 |
| Ab*1 | 83 | 10 | 12 | 5* | 5* | 15 | 25 |
| Ab*2 | 30 | 5* | 5* | 5* | 5* | 10 | 25 |
| Aab*2 | 15 | 5* | 5* | 5* | 5* | 5 | 20 |

5* indicates below detection limit.

TABLE 3

| sample name of DPC | purification | metal impurities (ppb by weight) | | | | | | | | | | | | |
|---|---|---|---|---|---|---|---|---|---|---|---|---|---|---|
| | | first elements | | | | | | second elements | | | | | | third element |
| | | Na | Fe | Cr | Mn | Ni | Pb | Cu | Zn | Pd | In | Al | Si | Ti |
| Dg | raw material-1 | 96 | 40 | 15 | 5 | 5 | 1 | 1* | 11 | 1* | 15 | 42 | 15 | 1* |
| Da*1 | one time of sublimation | 10 | 27 | 8 | 1 | 1 | 1 | 1 | 2 | 1* | 4 | 21 | 7 | 1* |
| D-c | washing in water, distillation + one time of sublimation* | 10 | 9 | 1* | 1* | 1* | 1* | 1* | 1* | 1* | 1* | 1* | 2 | 1* |
| D-d | acetone + ion exchange + distillation | 3 | 1* | 1* | 1* | 1* | 1* | 1* | 1* | 1* | 1* | 1* | 1* | 1* |
| | raw material-2 | 25 | 45 | 16 | 7 | 7 | 10 | 1* | 12 | 2 | 1* | 12 | 11 | 1* |
| | raw material-3 | 3 | 25 | 8 | 2 | 2 | 1* | 1* | 3 | 1* | 1* | 6 | 6 | 2 |

| sample name of DPC | non-metal impurities (ppm by weight) fourth elements | | | | | hazen | |
|---|---|---|---|---|---|---|---|
| | P | N | S | Cl | Br | APHA 0 hour | APHA retention for 2 hours |
| Dg | 1 | 2 | 1 | 2 | 1* | 10 | 20 |
| Da*1 | 1 | 1 | 1* | 1 | 1* | 5 | 15 |
| D-c | 1* | 1* | 1* | 1 | 1* | 5 | 15 |
| D-d | 1* | 1* | 1* | 1* | 1* | 5 | 15 |
| | 2 | 5 | 1 | 2 | 3 | 10 | 40 |
| | 1* | 1 | 1* | 1 | 1* | 5 | 35 |

1* indicates below detection limit.

Comparative Example 1

An aromatic polycarbonate was produced as follows. 137 parts by weight of commercially available BPA (Ag) and 135 parts by weight of purified DPC (Da*1) as raw materials, and 8.2×10$^{-6}$ part by weight of a disodium salt of bisphenol A and 5.5×10$^{-3}$ part by weight of tetramethylammonium hydroxide (to be abbreviated as TMAH hereinafter) as polymerization catalysts were charged into a reactor equipped with a stirrer, fractionating column and decompressor and molten at 180° C. under a nitrogen atmosphere.

The inside pressure of the reactor was reduced to 13.33 kPa (100 mmHg) to carry out a reaction under agitation for 20 minutes while the formed phenol was distilled off. After the temperature was raised to 200° C., the pressure was gradually reduced to carry out the reaction at 4,000 kPa (30 mmHg) for 20 minutes while phenol was distilled off. The reaction was further continued by gradually increasing the temperature to 220° C. for 20 minutes, 240° C. for 20 minutes and 260° C. for 20 minutes and then by reducing the pressure to 2.666 kPa (20 mmHg) at 260° C. for 10 minutes, 1.333 kPa (10 mmHg) for 5 minutes and finally at 260° C. and 66.7 Pa (0.5 mmHg) until the viscosity average molecular weight became 15,300.

Thereafter, 3.6×10$^{-4}$ part by weight of tetrabutylphosphonium dodecylbenzene sulfonate (to be abbreviated as DBSP) was added and stirred at 260° C. and 66.7 Pa (0.5 mmHg)

for 10 minutes. The finally obtained aromatic polycarbonate had a viscosity average molecular weight of 15,300, a terminal hydroxyl group concentration of 86, a phenoxy terminal group concentration of 154 eq/ton-polycarbonate) and a melt viscosity stability of 0.

Comparative Example 2

Polymerization was carried out in the same manner as in Comparative Example 1 except that $1.7 \times 10^{-2}$ part by weight of tetrabutylphosphonium hydroxide (to be abbreviated as TBPH hereinafter) was used in place of TMAH. The finally obtained aromatic polycarbonate had a viscosity average molecular weight of 15,300, a terminal hydroxyl group concentration of 87, a phenoxy terminal group concentration of 152 (eq/ton-polycarbonate) and a melt viscosity stability of 0.

Example 1

The aromatic polycarbonate obtained in Comparative Example 1 was dissolved in $1.5 \times 10^3$ parts by weight of NMP for the electronic industry, $1.1 \times 10^{-4}$ parts by weight of methanol for the electronic industry was added to separate the precipitated polymer by filtration, and the polymer was dried at 13.3 Pa (0.1 mmHg) and 100° C. for 24 hours. The obtained aromatic polycarbonate had a viscosity average molecular weight of 15,300, a terminal hydroxyl group concentration of 85, a phenoxy terminal group concentration of 154 (eq/ton-polycarbonate) and a melt viscosity stability of 0.

Example 2

2-methoxycarbonylphenylphenyl carbonate (to be abbreviated as SAM hereinafter) was added in an amount of $8.0 \times 10^{-3}$ part by weight based on 1 part by weight of a polymer when the viscosity average molecular weight of a polycarbonate became 15,300 in the production of the polycarbonate in Comparative Example 1 and stirred at 260° C. and 133.3 Pa (1 mmHg) for 10 minutes. Thereafter, $2.3 \times 10^{-6}$ part by weight of DBSP was added and stirred at 260° C. and 66.7 Pa (0.5 mmHg) for 10 minutes.

The obtained aromatic polycarbonate was dissolved in $1.5 \times 10^3$ parts by weight of NMP for the electronic industry, $1.1 \times 10^4$ parts by weight of methanol for the electronic industry was added to separate the precipitated polymer by filtration, and the polymer was dried at 13.3 Pa (0.1 mmHg) and 100° C. for 24 hours. The obtained aromatic polycarbonate had a viscosity average molecular weight of 15,300, a terminal hydroxyl group concentration of 60, a phenoxy terminal group concentration of 179 (eq/ton-polycarbonate) and a melt viscosity stability of 0.

Example 3

The procedure of Example 2 was repeated except that SAM was used in an amount of $17.6 \times 10^{-3}$ part by weight based on 1 part by weight of the polymer. The obtained aromatic polycarbonate had a viscosity average molecular weight of 15,300, a terminal hydroxyl group concentration of 30, a phenoxy terminal group concentration of 209 (eq/ton-polycarbonate) and a melt viscosity stability of 0.

Example 4

Melt polymerization was carried out in the same manner as in Comparative Example 1 except that purified BPA (Ac*1) and purified DPC (Da*1) were used. After polymerization, SAM and DBSP were used in the same manner as in Example 3. The finally obtained aromatic polycarbonate had a viscosity average molecular weight of 15,300, a terminal hydroxyl group concentration of 30, a phenoxy terminal group concentration of 209 (eq/ton-polycarbonate) and a melt viscosity stability of 0.

Example 5

The aromatic polycarbonate obtained in Comparative Example 1 was dissolved in $1.5 \times 10^3$ parts by weight of NMP for the electronic industry and treated with activated carbon, and $1.1 \times 10^4$ parts by weight of methanol for the electronic industry was added dropwise under agitation at a rate of $1 \times 10^2$ parts by weight/min to separate the precipitated polymer by filtration. This reprecipitation operation was repeated twice and the obtained polymer was dried at 13.3 Pa (0.1 mmHg) and 100° C. for 24 hours. The obtained polycarbonate had a viscosity average molecular weight of 15,300, a terminal hydroxyl group concentration of 85, a phenoxy terminal group concentration of 154 (eq/ton-polycarbonate) and a melt viscosity stability of 0.

Example 6

Melt polymerization was carried out in the same manner as in Comparative Example 1 except that purified BPA (Ab*2) and purified DPC (D-c) were used. After polymerization, SAM and DBSP were used as in Example 3. The finally obtained aromatic polycarbonate had a viscosity average molecular weight of 15,300, a terminal hydroxyl group concentration of 30, a phenoxy terminal group concentration of 209 (eq/ton-polycarbonate) and a melt viscosity stability of 0.

Example 7

The procedure of Example 6 was repeated except that TMAH was used in an amount of $5.5 \times 10^{-2}$ part by weight. The finally obtained aromatic polycarbonate had a viscosity average molecular weight of 15,300, a terminal hydroxyl group concentration of 30, a phenoxy terminal group concentration of 209 (eq/ton-polycarbonate) and a melt viscosity stability of 0.

Example 8

The aromatic polycarbonate obtained in Comparative Example 1 was dissolved in 1.5×103 parts by weight of NMP for the electronic industry and treated with a mixed ion exchange resin column, and $1.1 \times 10^4$ parts by weight of methanol for the electronic industry was added dropwise under agitation at a rate of $1 \times 10^2$ parts by weight/min to separate the precipitated polymer by filtration. This reprecipitation operation was repeated twice and the obtained polymer was dried at 13.3 Pa (0.1 mmHg) and 100° C. for 24 hours. The finally obtained aromatic polycarbonate had aviscosity average molecular weight of 15,300, a terminal hydroxyl group concentration of 85, a phenoxy terminal group concentration of 154 (eq/ton-polycarbonate) and a melt viscosity stability of 0.

Example 9

Melt polymerization was carried out in the same manner as in Comparative Example 1 except that purified BPA (Aab*2) and purified DPC (D-d) were used. After polymerization, SAM and DBSP were used as in Example 3. The finally obtained aromatic polycarbonate had a viscosity average molecular weight of 15,300, a terminal hydroxyl group concentration of 209 (eq./ton-polycarbonate) and a melt viscosity stability of 0.

Comparative Example 3

Raw materials, and $8.2 \times 10^{-5}$ part by weight of a disodium salt of bisphenol A and $5.5 \times 10^{-3}$ part by weight of TMAH as polymerization catalysts were charged into a reactor equipped with a stirrer, fractionating column and decompressor and molten at 180° C. under a nitrogen atmosphere as in Comparative Example 1.

The inside pressure of the reactor was reduced to 13.33 kPa (100 mmHg) to carry out a reaction under agitation for 20 minutes while the formed phenol was distilled off. After the temperature was raised to 200° C., the pressure was gradually reduced to carry out the reaction at 4.000 kPa (30 mmHg) for 20 minutes while phenol was distilled off. The reaction was further continued by gradually increasing the temperature to 220° C. for 20 minutes, 240° C. for 20 minutes and 260° C. for 20 minutes and then by reducing the pressure to 2.666 kPa (20 mmHg) at 260° C. for 10 minutes, 1.333 kPa (10 mmHg) for 5 minutes and finally at 280° C. and 66.7 Pa (0.5 mmHg) until the viscosity average molecular weight became 15,300.

Thereafter, $1.3 \times 10^{-3}$ part by weight of DBSP was added and stirred at 280° C. and 66.7 Pa (0.5 mmHg) for 10 minutes to obtain an aromatic polycarbonate. The obtained aromatic polycarbonate had a viscosity average molecular weight of 15,300, a terminal hydroxyl group concentration of 85, a phenoxy terminal group concentration of 154 eq/ton-polycarbonate and a melt viscosity stability of 0.

Comparative Example 4
(Mw=22,500)

The polymerization of the aromatic polycarbonate was further continued in Comparative Example 1 to obtain a polycarbonate having a viscosity average molecular weight of 22,500 in the end. The obtained aromatic polycarbonate had aviscosity average molecular weight of 22,500, a terminal hydroxyl group concentration of 73, a phenoxy terminal group concentration of 77 eq/ton-polycarbonate and a melt viscosity stability of 0.

Examples 10 and 11

The aromatic polycarbonate obtained in Comparative Example 4 was treated in the same manner as in Example 1 and Example 8. The obtained polycarbonates had a viscosity average molecular weight of 22,500, a terminal hydroxyl group concentration of 73, a phenoxy terminal group concentration of 77 eq/ton-polycarbonate and a melt viscosity stability of 0.

Comparative Example 5

502.8 g (2.21 mols) of raw material bisphenol A, 2.21 liters (4.19 mols of sodium hydroxide) of a 7.2% sodium hydroxide aqueous solution and 0.98 g (0.0056 mol) of hydrosulfite sodium were charged into a 5-liter reactor equipped with a phosgene blowing tube, thermometer and stirrer and dissolved, 1.27 liters of methylene chloride and 80.70 g (0.98 mol of sodium hydroxide) of a 48.5% sodium hydroxide aqueous solution were added under agitation, and 250.80 g (0.253 mol) of phosgene was added at 25° C. over 180 minutes to carry out a phosgenation reaction.

After the end of the phosgenation reaction, 17.51 g (0.117 mol) of p-tert-butylphenol, 80.40 g (0.97 mol) of a 48.5% sodium hydroxide aqueous solution and 1.81 ml (0.013 mol) of triethylamine as a catalyst were added, maintained at 33° C. and stirred for 2 hours to complete the reaction. A methylene chloride layer was separated from the reaction mixed solution which was then purified by washing in water times to obtain a polycarbonate resin having a viscosity average molecular weight of 15,300, a terminal hydroxyl group concentration of 15, a terminal phenoxy group concentration of 224 eq./ton-polycarbonate and a melt viscosity stability of 0.1.

Example 12

The same treatment as in Example 1 was made on the polymer of Comparative Example 5. Finally, a polycarbonate resin having a viscosity average molecular weight of 15,300, a terminal hydroxyl group concentration of 15, a terminal phenoxy group concentration of 224 eq./ton-polycarbonate and a melt viscosity stability of 0 was obtained. The contents of impurities (unit: ppm, ppb) in the aromaticpolycarbonates obtained in Examples 1 to 12 and Comparative Examples 1 to 5 are shown in Table 4 below.

TABLE 4

| Experiment | | | terminal | metal impurities (ppb by weight) | | | | | | | | | | | | | | non-metal impurities (ppm by weight) | | | |
| | | | | | | first elements | | | | | second elements | | | | third element | | fourth elements | | | | | |
| No. | BPA | DPC | OH | Na | Fe | Cr | Mn | Ni | Pb | Cu | Zn | Pd | In | Si | Al | Ti | P | N | S | Cl | Br |
| C.Ex. 1 | Ag | Da*1 | 85 | 95 | 79 | 10 | 4 | 8 | 6 | 7 | 9 | 1* | 11 | 21 | 16 | 1* | 1* | 2 | 2 | 4 | 1* |
| C.Ex. 2 | Ag | Da*1 | 87 | 78 | 89 | 12 | 6 | 8 | 7 | 6 | 7 | 1* | 10 | 30 | 21 | 1* | 3 | 1* | 2 | 8 | 1* |
| Ex. 1 | Ag | Da*1 | 85 | 62 | 55 | 5 | 2 | 1 | 2 | 3 | 5 | 1* | 3 | 17 | 11 | 1* | 1* | 2 | 1 | 3 | 1* |
| Ex. 2 | Ag | Da*1 | 60 | 61 | 57 | 4 | 2 | 1 | 2 | 3 | 6 | 1* | 3 | 16 | 11 | 1* | 1* | 2 | 1 | 3 | 1* |
| Ex. 3 | Ag | Da*1 | 30 | 62 | 56 | 5 | 2 | 1 | 2 | 4 | 5 | 1* | 4 | 15 | 10 | 1* | 1* | 2 | 1 | 3 | 1* |
| Ex. 4 | Ac*1 | Da*1 | 30 | 58 | 54 | 9 | 2 | 1* | 1* | 1* | 4 | 1* | 6 | 28 | 17 | 1* | 1* | 1 | 1* | 1* | 1* |
| Ex. 5 | Ag | Da*1 | 85 | 29 | 35 | 1 | 1* | 1* | 1* | 1 | 1 | 1* | 1 | 3 | 2 | 1* | 1* | 1* | 2 | 2 | 1* |
| Ex. 6 | Ab*2 | D-c | 30 | 32 | 25 | 1 | 2 | 1* | 1* | 1* | 1* | 1* | 1* | 4 | 6 | 1* | 1* | 1 | 1* | 1* | 1* |
| Ex. 7 | Ab*2 | D-c | 30 | 32 | 25 | 1 | 2 | 1* | 1* | 1* | 1* | 1* | 1* | 4 | 6 | 1* | 1* | 2 | 1* | 1* | 1* |
| Ex. 8 | Ag | Da*1 | 85 | 18 | 16 | 1 | 1* | 1* | 1* | 1* | 1* | 1* | 1* | 1 | 1 | 1* | 1* | 1* | 1* | 1* | 1* |
| Ex. 9 | Aab*2 | D-d | 30 | 16 | 7 | 1* | 1* | 1* | 1* | 1* | 1* | 1* | 1* | 4 | 1* | 1* | 1* | 1 | 1* | 1* | 1* |
| C.Ex. 3 | Ag | Da*1 | 85 | 175 | 82 | 12 | 1 | 2 | 1 | 1 | 5 | 1* | 3 | 21 | 18 | 1* | 1* | 2 | 2 | 4 | 1* |
| C.Ex. 4 | Ag | Da*1 | 73 | 95 | 80 | 10 | 4 | 7 | 7 | 6 | 8 | 1* | 10 | 23 | 18 | 1* | 1* | 1 | 2 | 3 | 1* |

TABLE 4-continued

| | | | terminal | | metal impurities (ppb by weight) | | | | | | | | | | | | third element | non-metal impurities (ppm by weight) | | | | |
|---|---|---|---|---|---|---|---|---|---|---|---|---|---|---|---|---|---|---|---|---|---|---|
| Experiment | | | | | first elements | | | | | second elements | | | | | | | | fourth elements | | | | |
| No. | BPA | DPC | OH | Na | Fe | Cr | Mn | Ni | Pb | Cu | Zn | Pd | In | Si | Al | Ti | P | N | S | Cl | Br |
| Ex. 10 | Ag | Da*1 | 73 | 66 | 56 | 7 | 3 | 1 | 2 | 4 | 5 | 1* | 5 | 16 | 12 | 1* | 1* | 2 | 1 | 2 | 1* |
| Ex. 11 | Ag | Da*1 | 73 | 18 | 17 | 4 | 1* | 1* | 1* | 1* | 1* | 1* | 1* | 1 | 1 | 1* | 1* | 1* | 1* | 1* | 1* |
| C.Ex. 5 | Ag | Da*1 | 15 | 25 | 81 | 1 | 2 | 2 | 2 | 8 | 10 | 1* | 6 | 21 | 18 | 1* | 1* | 1* | 1* | 7 | 1* |
| Ex. 12 | Ag | Da*1 | 15 | 12 | 60 | 6 | 1* | 1* | 1* | 4 | 4 | 1* | 6 | 16 | 13 | 1* | 1* | 1* | 1* | 1 | 1* |

Ex.: Example
C.Ex.: Comparative Example
1* indicates below detection limit.

The physical properties of the aromatic polycarbonates obtained in Examples 1 to 12 and Comparative Examples 1 to are shown in Table 5 below.

TABLE 5

| | initial physical properties | | | | physical properties after durability test | | |
|---|---|---|---|---|---|---|---|
| | | OH concentration | color | | deterioration | impact strength | transparency |
| Example | polymerization degree | eg/ton-polycarbonate | L value | b value | in color Δb value | retention (%) | retention (%) |
| C.Ex. 1 | 15,300 | 85 | 65 | 0.9 | 2 | 87 | 88 |
| C.Ex. 2 | 15,300 | 85 | 64 | 1.1 | 2.1 | 88 | 88 |
| Ex. 1 | 15,300 | 85 | 65 | 0.9 | 0.9 | 93 | 91 |
| Ex. 2 | 15,300 | 60 | 65 | 0.9 | 0.8 | 93 | 92 |
| Ex. 3 | 15,300 | 30 | 65 | 0.9 | 0.7 | 93 | 93 |
| Ex. 4 | 15,300 | 30 | 65 | 0.8 | 0.7 | 93 | 93 |
| Ex. 5 | 15,300 | 85 | 65 | 0.7 | 0.7 | 93 | 94 |
| Ex. 6 | 15,300 | 30 | 65 | 0.7 | 0.6 | 93 | 94 |
| Ex. 7 | 15,300 | 30 | 65 | 0.8 | 0.7 | 92 | 93 |
| Ex. 8 | 15,300 | 85 | 65 | 0.7 | 0.6 | 93 | 95 |
| Ex. 9 | 15,300 | 30 | 65 | 0.7 | 0.6 | 93 | 95 |
| C.Ex. 3 | 15,300 | 85 | 64 | 0.9 | 2.5 | 85 | 86 |
| C.Ex. 4 | 22,500 | 73 | 63 | 1.3 | 1.4 | 94 | 89 |
| Ex. 10 | 22,500 | 73 | 63 | 1.2 | 0.9 | 97 | 92 |
| Ex. 11 | 22,500 | 73 | 64 | 1.2 | 0.7 | 97 | 93 |
| C.Ex. 5 | 15,300 | 15 | 67 | 0.8 | 1.7 | 89 | 89 |
| Ex. 12 | 15,300 | 15 | 67 | 0.7 | 0.7 | 90 | 92 |

Ex.: Example
C.Ex.: Comparative Example

Examples 13 and 14 and Comparative Example 6

0.01 wt % of tris(2,4-di-t-butylphenyl)phosphite and 0.08 wt % of glycerol monostearate were added to each of the aromatic polycarbonates of Examples 8 and 9 and Comparative Example 3. The obtained composition was molten and kneaded by a vented double-screw extruder (KTX-46 of Kobe Steel, Ltd.) at a cylinder temperature of 240° C. while it was degassed to obtain pellets. The pellets were used to carry out a temperature and humidity deterioration test for DVD (DVD-Video) disk substrates.

A melt mold special for DVDs was attached to the DISK3 M III injection molding machine of Sumitomo Heavy Industries, Ltd., a nickel DVD stamper having information including an address signal was set in this metal mold, the above pellets were injected into the hopper of a molding machine automatically, and a DVD disk substrate having a diameter of 120 mm and a thickness of 0.6 mm was molded at a cylinder temperature of 380° C., a metal mold temperature of 115° C., an injection speed of 200 mm/sec and a retention pressure of 3,432 kPa (35 kgf/cm$^2$).

To test the long-term reliability of an optical disk under severe temperature and humidity conditions, the aromatic polycarbonate optical disk substrate was maintained at a temperature of 80° C. and a relative humidity of 85% for 1,000 hours and then evaluated by the following measurement. Number of formed white points: The optical disk substrate after the temperature and humidity deterioration test was observed through a polarization microscope to count the number of formed white points of 20 μm or more in size. This was made on 25 optical disk substrates (diameter of 120 mm) to obtain a mean value which was taken as the number of white points.

As a result, the numbers of white points of Examples 13 and 14 and Comparative Example 6 were 0.2, 0.1 and 3.5, respectively.

Example 15

After the aromatic polycarbonate of Example 10 was molten, it was supplied to the T die of a molding machine by a gear pump quantitatively. 0.003 wt % of trisnonylphenyl phosphate was added before the gear pump and the aromatic polycarbonate was melt extruded into the form of a sheet having a thickness of 2 mm or 0.2 mm and a width of 800 mm while it was sandwiched between a mirror surface cooling roll and a mirror surface roll or contacted on one side.

A visible light curable plastic adhesive (BENEFIX PC of Ardel Co., Ltd.) was applied to one side of the obtained aromatic polycarbonate sheet (thickness of 2 mm) to form an adhesive layer on the sheet while the sheet was extruded in one direction such that air bubbles were not contained in the sheet and exposed to light having an energy of 5,000 mJ/cm$^2$ by an optical curing device equipped with a visible light-exclusive metal halide lamp to obtain a laminate. When the adhesive strength of the obtained laminate was measured in accordance with JIS K-6852 (compression shear adhesive strength test method), it was 10.4 MPa (106 Kgf/cm$^2$).

A uniform mixed solution of ink (Natsuda 70-9132: color 136D smoke) and a solvent (isophorone/cyclohexane/isobutanol=40/40/20 (wt %)) was printed on a 0.2 mm thick aromatic polycarbonate sheet by a silk screen printer and dried at 100° C. for 60 minutes. The ink printed surface was satisfactory without a transfer failure.

Separately, a sheet (thickness of 0.2 mm) printed with printing ink prepared by mixing 30 parts of a polycarbonate resin (specific viscosity of 0.895, Tg of 175° C.) obtained from general interfacial polycondensation between 1,1-bis(4-hydroxyphenyl)cyclohexane and phosgene, 15 parts of Plast Red 8370 (of Arimoto Kagaku Kogyo Co., Ltd.) as a dye and 130 parts of dioxane as a solvent was placed in an injection molding metal mold and polycarbonate resin pellets (Panlite L-1225 of Teijin Chemicals, Ltd.) were insert molded at 310° C. The pattern of the printed portion of the molded product after insert molding had no abnormalities such as blotches and blurry spots and an insert molded product whose printed portion had a good appearance was obtained.

Examples 16 to 22

0.003 wt % of trisnonylphenyl phosphite and 0.05 wt % of trimethyl phosphate were added to the aromatic polycarbonate of Example 10 and uniformly mixed to obtain aromatic polycarbonate powders. The powders and components (shown by the following symbols) in Tables 6 and 7 were uniformly mixed together using a tumbler, the resulting mixture was pelletized by a 30 mm-diameter vented double-screw extruder (KTX-30 of Kobe Steel, Ltd.) at a cylinder temperature of 260° C. and a vacuum degree of 1.33 kPa (10 mmHg) while it was degassed, and the obtained pellets were dried at 120° C. for 5 hours and molded into a measurement piece by an injection molding machine (SG150U of Sumitomo Heavy Industries, Ltd.) at a cylinder temperature of 270° C. and a metal mold temperature of 80° C. to carry out the following evaluations. The results are shown in Tables 6 and 7.

(1)-1 ABS: styrene-butadiene-acrylonitrile copolymer; Suntac UT-61; Mitsui Chemicals, Inc.
(1)-2 AS: styrene-acrylonitrile copolymer; Stylax-AS 767 R27; Asahi Chemical Industry, Co., Ltd.
(1)-3 PET: polyethylene terephthalate; TR-8580; Teijin Limited, intrinsic viscosity of 0.8
(1)-4 PBT: polybutylene terephthalate; TRB-H; Teijin Limited, intrinsic viscosity of 1.07
(2)-1 MBS: methyl (meth)acrylate-butadiene-styrene copolymer; Kaneace B-56; Kaneka Corporation
(2)-2 E-1: butadiene-alkyl acrylate-alkyl methacrylate copolymer; Paraloid EXL-2602; Kureha Chemical Industry, Co., Ltd.
(2)-3 E-2: composite rubber comprising a polyorganosiloxane component and a polyalkyl(meth)acrylate rubber component which form an interpenetrating network structure; Metabrene S-2001; Mitsubishi Rayon Co., Ltd.
(3)-1 T: talc; HS-T0.8; Hayashi Kasei Co., Ltd., average particle diameter L measured by laser diffraction method=5 μm, L/D=8
(3)-2 G: glass fiber; chopped strand ECS-03T-511; Nippon Electric Glass Co., Ltd., urethane focusing treatment, fiber diameter of 13 μm
(3)-3 W: wollastonite; Sikatec NN-4; Tomoe Kogyo Co., Ltd., number average fiber diameter D obtained by observing through an electron microscope =1.5 μm, average fiber length=17 μm, aspect ratio L/D=20
(4) WAX: olefin-based wax obtained by copolymerizing α-olefin and maleic anhydride; Diacalna-P30; Mitsubishi Kasei Corporation (content of maleic anhydride=10 wt %)

(A) Flexural Modulus

This was measured in accordance with ASTM D790.

(B) Notched Impact Value

This was measured by striking a weight against a 3.2 mm thick test piece from the notch side in accordance with ASTM D256.

(C) Fluidity

This was measured by an Archimedes type spiral flow (thickness of 2 mm, width of 8 mm) at a cylinder temperature of 250° C., a metal mold temperature of 80° C. and an injection pressure of 98.1 MPa.

(D) Chemical Resistance

A 1% distortion was added to a tensile test piece used in ASTM D638 and immersed in 30° C. Esso regular gasoline for 3 minutes and then the tensile strength of the test piece was measured to calculate retention. The retention was calculated from the following expression.

retention (%)=(strength of treated sample/strength of untreated sample)×100

TABLE 6

| | | | Ex. 16 | Ex. 17 | Ex. 18 | Ex. 19 |
|---|---|---|---|---|---|---|
| composition | polycarbonate of Example 10 | wt % | 60 | 60 | 60 | 60 |
| | ABS | wt % | 40 | 40 | 40 | — |
| | AS | wt % | — | — | — | 30 |
| | MBS | wt % | — | — | — | 10 |
| | total | wt parts | 100 | 100 | 100 | 100 |
| | G | wt parts | 15 | — | — | 15 |
| | W | wt parts | — | 15 | — | — |
| | T | wt parts | — | — | 15 | — |
| | WAX | wt parts | — | 1 | 1 | — |
| characteristic properties | flexural modulus | MPa | 3,450 | 3,200 | 2,900 | 3,300 |
| | fluidity | cm | 30 | 27 | 29 | 34 |
| | notched impact value | J/m | 75 | 70 | 50 | 85 |

Ex.: Example

TABLE 7

| | | | Ex. 20 | Ex. 21 | Ex. 28 |
|---|---|---|---|---|---|
| composition | polycarbonate of Example 10 | wt % | 70 | 70 | 70 |
| | PBT | wt % | — | 30 | 5 |
| | PET | wt % | 30 | — | 25 |
| | total | wt parts | 100 | 100 | 100 |
| | E-1 | wt parts | 5 | 5 | — |
| | E-2 | wt parts | — | — | 5 |
| | G | wt parts | 20 | — | — |
| | W | wt parts | — | 10 | — |
| | T | wt parts | — | — | 10 |
| | WAX | wt parts | — | 1 | 1 |

TABLE 7-continued

| | | | Ex. 20 | Ex. 21 | Ex. 28 |
|---|---|---|---|---|---|
| characteristic properties | flexural modulus | MPa | 5,770 | 3,560 | 3,400 |
| | chemical resistance | % | 89 | 85 | 83 |
| | notched impact value | J/m | 215 | 540 | 519 |

Effect of the Invention

The durability, especially long-term durability under severe temperature and humidity conditions of a polymer is greatly improved and the excellent color, transparency and mechanical strength of the polymer are retained by suppressing the contents of specific impurities in the aromatic polycarbonate to specific values or less as in the present invention.

An aromatic polycarbonate resin having excellent stability can be produced by polymerizing DPC and BPA whose contents of specific metal elements are specific values or less as raw materials.

What is claimed is:

1. An aromatic polycarbonate which comprises a main recurring unit represented by the following formula (1):

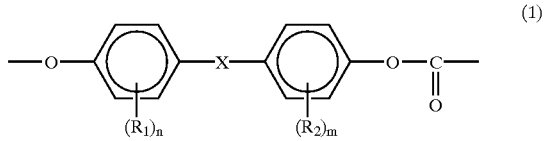

wherein $R_1$ and $R_2$ are each independently alkyl group having 1 to 20 carbon atoms, alkoxy group having 1 to 20 carbon atoms, cycloalkyl group having 6 to 20 carbon atoms, aryl group having 6 to 20 carbon atoms, cycloalkoxy group having 6 to 20 carbon atoms or aryloxy group having 6 to 20 carbon atoms, m and n are each independently an integer of 0 to 4, and X is a single bond, oxygen atom, carbonyl group, alkylene group having 1 to 20 carbon atoms, alkylidene group having 2 to 20 carbon atoms, cycloalkylene group having 6 to 20 carbon atoms, cycloalkylidene group having 6 to 20 carbon atoms, arylene group having 6 to 20 carbon atoms or alkylene-arylene-alkylene group having 6 to 20 carbon atoms, and terminal groups consisting essentially of aryloxy groups (A) and phenolic hydroxyl groups (B), the (A)/(B) molar ratio being 95/5 to 40/60, and which has a melt viscosity stability measured under a nitrogen stream at a shear rate of 1 rad./sec and 300° C. for 30 minutes of 0.5% or less, a sodium metal element content of 100 ppb or less and a content of each of first elements, Ni, Pb, Cr, Mn and Fe of 70 ppb or less, and wherein the relationship between the concentration (H) (eq./ton-polycarbonate) of terminal hydroxyl groups and the total content (Σfirst elements) (ppb) of the first elements is represented by (H)≦Σfirst elements.

2. The aromatic polycarbonate of claim 1, wherein the content of each of the first elements is 40 ppb or less.

3. The aromatic polycarbonate of claim 1, wherein the content of sodium metal element is 70 ppb or less and the content of each of the first elements is 20 ppb or less.

4. The aromatic polycarbonate of claim 1, wherein the content of sodium metal element is 20 ppb or less and the content of each of the first elements is 10 ppb or less.

5. The aromatic polycarbonate of claim 1, wherein the relationship between the concentration (H) (eq./ton-polycarbonate) of terminal hydroxyl groups and the total content (Σfirst elements) (ppb) of the first elements is represented by (H)≦0.5×(Σfirst elements).

6. The aromatic polycarbonate of claim 1, wherein the content of each of second elements Cu, Zn, Pd, In, Si and Al, is 20 ppb or less.

7. The aromatic polycarbonate of claim 1, wherein the content of a third element Ti is 1 ppb or less and the content of each of fourth elements P, N, S, Cl and Br is 1 ppm or less.

8. A molded product of the aromatic polycarbonate of any one of claim 1, 6 or 7.

9. The molded product of claim 8 which is an optical disk substrate.

10. A method for producing a polycarbonate which comprises polycondensing an aromatic dihydroxy compound and a carbonic acid diester in the presence of a catalyst containing a) at least one basic compound selected from the group consisting of a nitrogen-containing basic compound and a phosphorus-containing basic compound in an amount of 10 to 1,000μ chemical equivalents based on 1 mol of the aromatic dihydroxy compound and b) at least one compound selected from the group consisting of an alkali metal compound and an alkali earth metal compound in an amount of 0.05 to 5μ chemical equivalents based on 1 mol of the aromatic dihydroxy compound, wherein the aromatic dihydroxy compound and the carbonic acid diester having 1) a sodium metal element content of 52 ppb or less and 2) a content of each of first elements Fe, Cr, Mn, Ni and Pb of 40 ppb or less are used, and 3) the amount of the basic compound based on 1 mol of the aromatic dihydroxy compound is not more than 20× (Fe*)+200 based on the total weight Fe* (ppb) of Fe contained in the aromatic dihydroxy compound and Fe contained in the carbonic acid diester.

11. The method of claim 10, wherein the aromatic dihydroxy compound and the carbonic acid diester each have 1) a sodium metal element content of 35 ppb or less by weight and 2) a content of each of the first elements of 23 ppb or less by weight.

12. The method of claim 10, wherein the aromatic dihydroxy compound and the carbonic acid diester each have 1) a sodium metal element content of 6 ppb or less by weight and 2) a content of each of the first elements of 6 ppb or less by weight.

13. The method of claim 10, wherein the aromatic dihydroxy compound and the carbonic acid diester each have a content of each of second elements Cu, Zn, In, Pd, Si and Al of 10 ppb or less by weight.

14. The method of claim 10, wherein the aromatic dihydroxy compound and the carbonic acid diester each have a content of a third element Ti of 1 ppb or less by weight and a content of each of fourth elements P, N, S, Cl and Br of 1 ppm or less by weight.

15. The method of claim 10, wherein the aromatic dihydroxy compound is bisphenol A.

16. The method of claim 15, wherein when the bisphenol A is analyzed by high-speed liquid chromatography (using a 0.1% phosphoric acid aqueous solution as an elute A and acetonitrile as an elute B, this measurement is carried out at a total flow rate of the elute A and the elute B of 0.9 ml/min when the elute A/elute B ratio is 1:1 for 5 minutes after the start of measurement with a high-speed liquid chromatograph comprising a column having an inner diameter of 4.6 mm and a length of 250 mm, filled with an adsorbent prepared by bonding 15% (amount of carbon) of an octadecyl group to a high-purity spherical silica gel having a pore diameter of 100 Å and maintained at 40° C.±0.1° C., and then gradient operation is carried out by continuously increasing the amount of the elute B after 5 minutes from the start of measurement so that the ratio of the elute A to the elute B becomes 0:1 in 55 minutes after the start of measurement while the total flow rate is fixed, to analyze BPA with a detector for ultraviolet light having a wavelength of 254 nm), the ratio of the total of the absorption peak areas of compounds eluting for 15.5 to 24 minutes to the absorption peak area of bisphenol A is $2.0 \times 10^{-3}$ or less.

17. The method of claim 16, wherein the ratio of the total of the absorption peak areas of the eluting compounds to the absorption peak area of bisphenol A is $1.0 \times 10^{-3}$ or less.

18. The method of claim 16, wherein when bisphenol A is analyzed by high-speed liquid chromatography, the ratio of the total of the absorption peak areas of compounds eluting for 22 to 24 minutes to the absorption peak area of bisphenol A is $5 \times 10^{-5}$ or less.

19. The method of claim 18, wherein when bisphenol A is analyzed by high-speed liquid chromatography, the ratio of the total of the absorption peak areas of compounds eluting for 22 to 24 minutes and having a molecular weight of 307 or more and 309 or less to the absorption peak area of bisphenol A is $2 \times 10^{-5}$ or less.

20. The method of claim 16, wherein bisphenol A has a total content of 1-naphthols represented by the following formula (2):

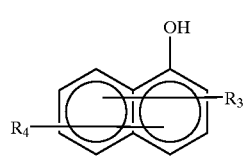

(2)

wherein $R_3$ and $R_4$ are each independently methyl, ethyl, n-propyl, isopropyl or isopropenyl, of $2 \times 10^{-4}$ part or less by weight based on 1 part by weight of bisphenol A.

21. The method of claim 20, wherein the total content of 1-napthols is $1 \times 10^{-4}$ part or less by weight based on 1 part by weight of bisphenol A.

22. The method of claim 16, wherein bisphenol A contains a paraflavan compound represented by the following formula (3):

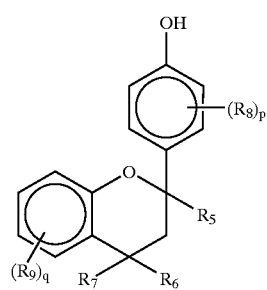

(3)

wherein $R_5$ to $R_7$ are each independently an alkyl group having 1 to 4 carbon atoms, $R_8$ and $R_9$ are each independently an alkyl group having 1 to 4 carbon atoms, and p and q are each independently an integer of 0 to 4, in an amount of $5 \times 10^{-5}$ part or less by weight based on 1 part by weight of bisphenol A, and a codimer derivative represented by the following general formula (4):

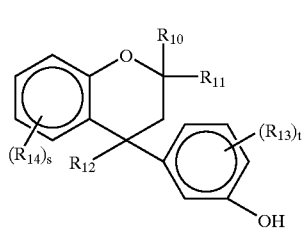

(4)

wherein $R_{10}$ to $R_{12}$ are each independently an alkyl group having 1 to 4 carbon atoms, $R_{13}$ and $R_{14}$ are each independently an alkyl group having 1 to 4 carbon atoms, and s and t are each independently an integer of 0 to 4, in an amount of $5 \times 10^{-5}$ part or less by weight based on 1 part by weight of bisphenol A.

23. The method of claim 16, wherein bisphenol A contains a chromene compound represented by the following formula (5):

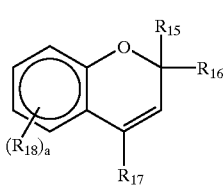

(5)

wherein $R_{15}$ to $R_{17}$ are each independently an alkyl group having 1 to 4 carbon atoms, $R_{18}$ is a hydrogen atom or alkyl group having 1 to 4 carbon atoms, and a is an integer of 0 to 4, in an amount of $1 \times 10^{-5}$ part or less by weight based on 1 part by weight of bisphenol A, and a compound represented by the following formula (6):

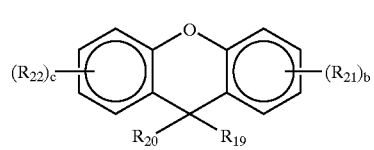

(6)

wherein $R_{19}$ and $R_{20}$ are each independently an alkyl group having 1 to 4 carbon atoms, $R_{21}$ and $R_{22}$ are each independently an alkyl group having 1 to 4 carbon atoms, and b and c are each independently an integer of 0 to 4, in an amount of $1 \times 10^{-5}$ part or less by weight based on 1 part by weight of bisphenol A.

* * * * *